United States Patent [19]
Lendi et al.

[11] 4,126,940
[45] Nov. 28, 1978

[54] ADJUSTABLE FORK GAUGE

[75] Inventors: Georges Lendi, Crissier; Adriano U. Zanier, Prilly, both of Switzerland

[73] Assignee: Tesa S.A., Vaud, Switzerland

[21] Appl. No.: 796,555

[22] Filed: May 13, 1977

[30] Foreign Application Priority Data

Jun. 11, 1976 [CH] Switzerland ............... 7393/76

[51] Int. Cl.² .................... G01B 5/02; G01B 5/08
[52] U.S. Cl. ................... 33/147 F; 33/147 H; 33/178 R
[58] Field of Search ............ 33/143 R, 143 F, 143 H, 33/147 R, 147 E, 147 F, 147 H, 178 R, 178 D

[56] References Cited

U.S. PATENT DOCUMENTS

| | | | |
|---|---|---|---|
| 1,617,284 | 2/1927 | Ames | 33/178 R |
| 1,863,673 | 6/1932 | Schraven | 33/178 R |
| 2,325,996 | 8/1943 | Eisele | 33/178 R |
| 3,238,627 | 3/1966 | Young, Jr. et al. | 33/147 H |

FOREIGN PATENT DOCUMENTS 514,192 11/1920 France ............... 33/178 R
1,458,510 10/1966 France ............... 33/178 R Primary Examiner—Richard R. Stearns
Attorney, Agent, or Firm—Anthony J. Casella

[57] ABSTRACT

An adjustable fork gauge including a main body having a slide on which a first, fixed jaw is slidably and adjustably mounted and formed from a block having an anvil with a plane face integral with said block; a second, spring clamping jaw adapted to press a plane or cylindrical portion of a part to be measured on the anvil of the fixed jaw; a feeler rod for the part to be measured including a contact adapted to emerge from the clamping jaw and displaceably mounted for translation in a bearing of the body such tha the axis of said feeler rod is perpendicular to the plane of the anvil of the fixed jaw; and a measuring or indicating transducer coupled to the body and having a movable element connected to the feeler rod.

10 Claims, 10 Drawing Figures

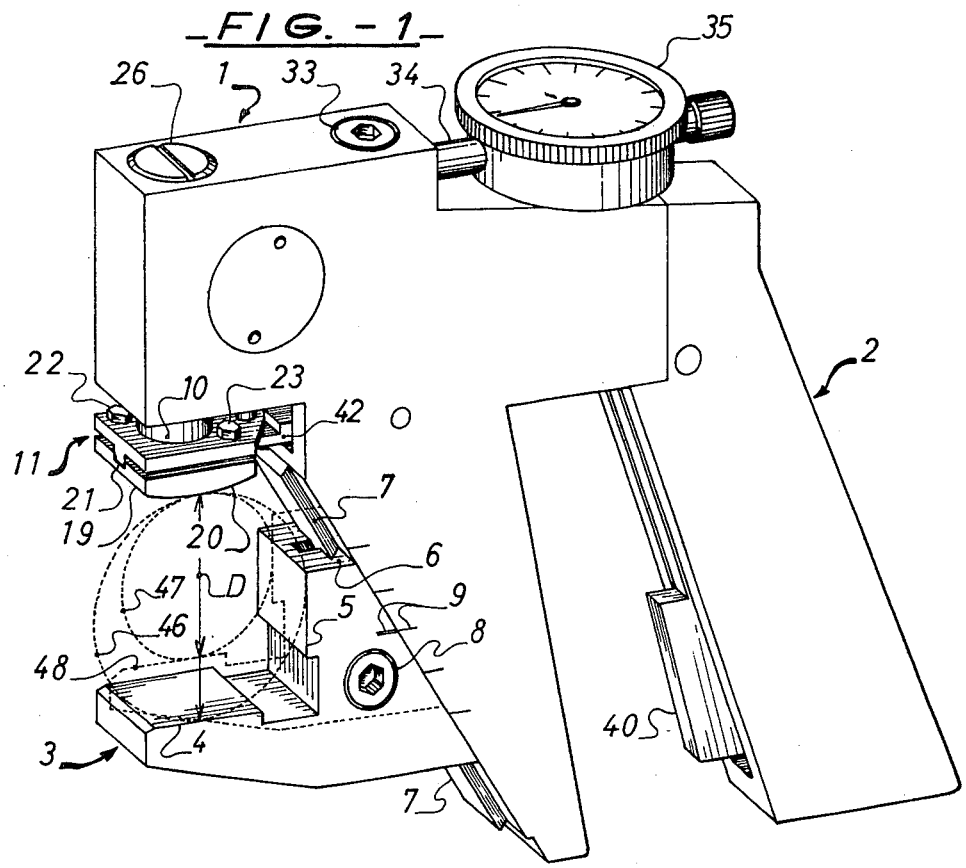
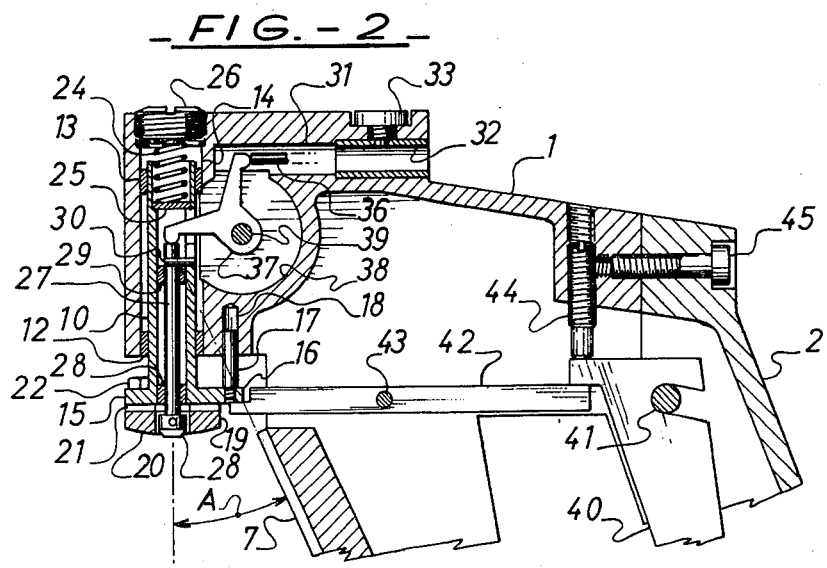

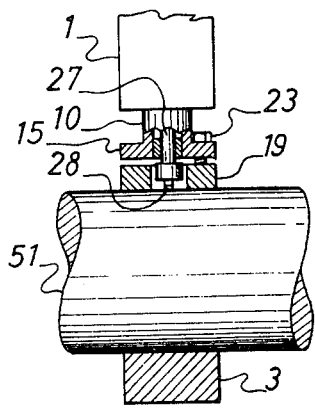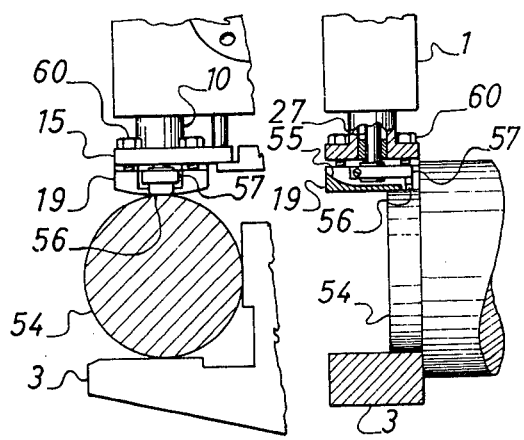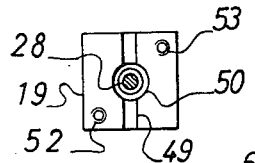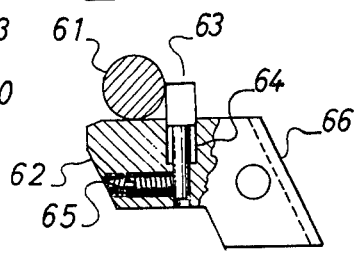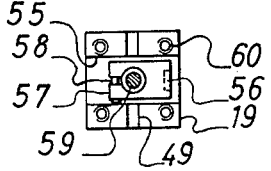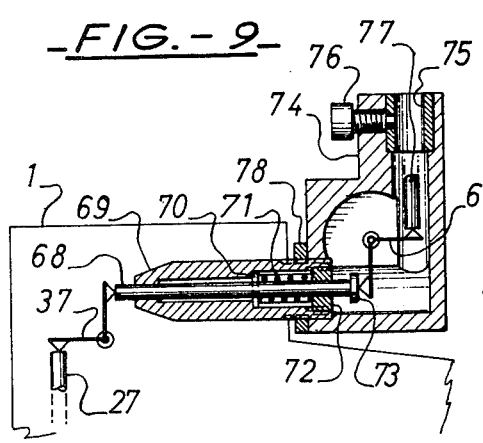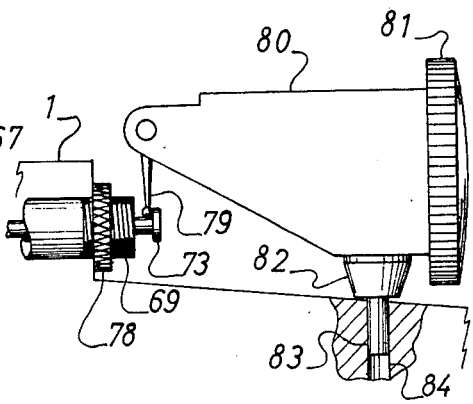

ADJUSTABLE FORK GAUGE

The present invention relates to an adjustable fork gauge adapted to measure and control the size of a workpiece or part, especially by comparison with a known size and rigorously exact with respect to a standard or to another part considered as a standard model.

Gauges are already known comprising a fixed jaw mounted on a body and comprising a plain faced anvil integral with a block whose position is adjustable by sliding along a slide of the body, a resilient clamping or securing jaw adapted to press a plane or cylindrical portion of a part to be measured on the anvil of the fixed jaw, a feeler rod for the part to be measured comprising a contact emerging from the securing jaw, movably mounted in a bearing of the body and the axis of which is perpendicular to the plane of the anvil of the fixed jaw, and a measuring transducer coupled to the body and the movable element of which is connected to the feeler rod.

These gauges are satisfactory and easy to use, but parallelism faults can occur between the fixed jaw and the securing jaw when, for example, one displaces the fixed jaw to adjust its position to the required calibration or even again when these jaws become worn by rubbing of the pieces to be controlled.

The defects in parallelism are detrimental to the precision of the measurements effected. This is due to the fact that when workpieces are pressed between two jaws presenting these defects, they do not bear in a perfect manner on the support of the anvil of the fixed jaw. And this is particularly detrimental when the mass of the workpiece is relatively large with respect to the mass of the gauge and the clamping pressure of the jaws. These defects in parallelism can also be produced when one changes the fixed jaw, for example when the dimension of the said jaw is no longer suitable for the size of the parts to be measured.

Furthermore, when determining the diameter of a cylindrical part, it is not always possible to ensure that the sensing is effected satisfactorily in the diametral plane, the sensitivity and the experience of the operator is predominant in this particular measurement calibration.

According to the present invention an improved adjustable fork gauge includes a main body having a slide on which a first, fixed jaw is slidably and adjustably mounted and formed from a block having an anvil, with a plane face integral with said block; a second, spring clamping jaw adapted to press a plane or cylindrical portion of a part to be measured on the anvil of the fixed jaw; a feeler rod for the part to be measured including a contact adapted to emerge from the clamping jaw and being displaceably mounted by the translation in a bearing of the body such that the axis of said feeler rod is perpendicular to the plane of the anvil of the fixed jaw; and a measuring or indicating transducer coupled to the body and having a movable element connected to the feeler rod, characterised in that the fixed jaw has a lateral abutment for supporting the part to be measured and said abutment has a plane face which is perpendicular to the plane of the face of the anvil of the said fixed jaw, in that the slide of the body and the block of the fixed jaw are inclined at the same acute angle (A) with respect to the axis of the feeler rod and said acute angle is inscribed in a plane perpendicular to the two planes constituted by the face of the anvil and the face of the abutment of the fixed jaw, and in that the clamping jaw includes a floating shoe at its end from which emerges the contact of the feeler rod; said floating shoe having a cylindrical bearing surface whose generictricies are, during working, parallel at least to the plane of the abutment of the fixed jaw, and said floating shoe being pivotably mounted on a linear pivot disposed between the said end of the clamping jaw and the floating shoe and the pivotal axis of which is perpendicular to the plane of the abutment surface of the fixed jaw; said floating shoe being connected to the end of the clamping jaw by at least one retaining member.

The invention will be described further, by way of example, with reference to the accompanying drawings, in which:

FIG. 1 is a perspective view of an adjustable fork gauge,

FIG. 2 is a partial longitudinal section of the gauge of FIG. 1.

FIGS. 3 and 4 are fragmentary details respectively comprising a sectional view from the front and a view from above of one embodiment of a detail of the gauge of FIG. 1;

FIGS. 5, 6 and 7 are respectively a front elevation, a view from above and a view from the side of the same detail as FIGS. 3 and 4 but of an alternative embodiment;

FIG. 8 is a side view of a detail of a further alternative embodiment;

FIGS. 9 and 10 are respectively a longitudinal section and a partial side elevation of a detail, concerning two variations.

An adjustable fork gauge is shown in FIG. 1 and comprises a body 1 having a hand grip 2 on which is mounted a jaw 3 which is adjustably locatable in fixed positions and which comprises an anvil 4 and a lateral abutment 5 the plane support faces of which for the part or workpiece to be measured are perpendicular to eachother. The anvil 4 and abutment 5 are integral with a block 6 whose position is adjustable along a slide 7 integral with the body 1 of the gauge. A clamping or locking screw 8 permits clamping of the jaw 3 in a chosen position by tightening of the two sides of the block 6 on the slide 7. The determination of the predetermined position may be facilitated although not essentially, by calibrations or index marks 9 engraved on the block and on the slide 7.

A tubular support is mounted in the front part of the body 1 above the anvil 4 of the jaw 3 and a securing or clamping jaw 11 is secured at the end thereof and is adapted to press against the part to be measured on the anvil 4. The tubular support 10 slides in two bearings 12 and 13 fixed in a cylindrical housing 14 of the body 1 and has a plate 15 at its lower end with an extension 16 on which a cylindrical teat 17 is screwed to extend parallel to the said tubular support 10. This teat 17 is displaceable in a cylindrical bore 18 of the body 1 and thus prevents the plate 15 and its support 10 from turning while at the same time permitting free linear movement in the bearings 12 and 13.

A floating shoe 19 is provided under the plate 15, and has a cylindrical bearing face 20 whose genericticies are parallel at least to the plane face of the abutment 5 during working operation. The shoe 19 is balancingly located on a linear pivot 21 integral with the plate 15, and the shoe 19 is freely retained by two screws 22 and 23 traversing the plate 15 with play and being located diagonally of the floating shoe 19. The tubular support assembly 10, the plate 15 and floating shoe 19 together form clamping jaw 11.

The clamping jaw 11 is downwardly biased by a compression spring 24 housed partly in the upper end of the tubular support 10 and with one end bearing on a stop plate 25, and housed partly in a cylindrical housing 14 of the body 1 where its other end bears on a screw 26 which closes the housing and permits adjustment of the tension of the spring 24. A concentric feeler rod 27 is slidingly mounted inside the tubular support 10 in two bearings 28 and 29 fixed in the said tubular support, and prevented from effecting angular movement by a cotter pin 30 fixed in the said feeler rod 27 and sliding in a longtiudinal groove formed in the wall of the tubular support 10. The cotter pin 30 also limits the downward displacement of the feeler rod 27 when it abuts against the bearing 29.

A contact 28, is fixed at the lower end of feeler rod 27 and emerges from the end of the tightening jaw 11, via a passage in the floating shoe 19. The operation of the contact 28 will be described later on.

Another cylindrical housing 31 is provided perpendicular to and converging with the first housing 14 of the body 1 and has a socket 32 secured therein and having a tightening tangent screw 33 adapted to securedly retain the barrel 34 of a measuring transducer 35 of the dial comparator type. A movable member of the feeler of this measuring device 35 has its end 36 represented in FIG. 2 and is connected to the feeler rod 27 of the gauge through the intermediary of an angle return lever 37 housed in a chamber 38 of the body 1. The lever 37 comprises a central shaft 39 on which the angle return lever 38 freely pivots without play. The contact between the feeler end 36 and the measuring device 35, the angle return lever 37 and the feeler rod 27 of the gauge is ensured by the normal pressure of the feeler end 36 of the measuring instrument.

The raising of the assembly of the clamping jaw 11 and of the feeler rod 27 is controlled by a trigger 40 which is located in the hand grip 2 and articulated on a spindle 41 integral with the hand grip and the trigger 40 acts via the intermediary of a lever 42 articulated on a pivot 43 integral with the body 1. The trigger 40 bears on an end of the said lever 42 which acts at its other end on the extension 16 of the plate 15 of the tightening jaw 11.

An abutment screw 44 is provided engaged in a screw thread and emerges from the body 1 so as to limit the course of the descent of the clamping jaw 11 to a desired value. A fixing screw 45 is shown in FIG. 2 and the hand grip 2 on the body 1 of the gauge.

In the jaw space the plane face of the anvil 4 of the jaw 3 is located in a plane perpendicular to the longitudinal axis of the feeler rod 27 and the slide 7 and the block 6 are inclined at an acute angle A with respect to the axis of rod 27. The acute angle A is inscribed in a perpendicular plane on the two planes constituted by the faces of the anvil 4 and of the abutment 5.

The angle A is chosen such that for a fork of diameter of cylindrical parts to be controlled between two limit values-as shown in FIG. 1 by circles 46 and 47 in fine broken lines - the feeling is always effected by the contact 28 of the feeler rod 27 in the diametral plane of the said parts containing the diameter D of the circles shown when these cylindrical parts are properly in contact against the anvil 4 and the abutment 5. The contour of the jaw 3 in a position corresponding to the diameter of the circle 47 is represented by fine broken lines 48.

The floating shoe 19 from which contact 28 emerges is shown in FIG. 3 and 4. The shoe 19 has a groove 49 in which there is located the linear pivot 21 of the plate 15 of the clamping jaw 11. The groove 49 and linear pivot 21 are interrupted by a central hole 50 permitting passage of the feeler rod 27 carrying the contact 28. Contact 28 has an end in the form of a narrow blade orientated in accordance with the diametral plan of the cylindrical part 51 to be measured. As can be seen in FIG. 4, two threaded holes 52 and 53 have screws 22 and 23 screwed therein as already shown in FIG. 1 and as previously described.

This connection arrangement permits a certain floating movement of the shoe 19 about the linear pivot 21 whilst always retaining it and thus ensuring upon tightening on the part to be measured which is well centralised on the anvil of the fixed jaw 3, the parallelism of the said shoe and of the said anvil automatically being established. The connecting system also permits locking of the shoe 19, if desired, in a position perfectly parallel to the plane face of the said anvil which can be extremely useful in facilitating the positioning of parts of large diameter between the jaws 3 and 11.

An alternative embodiment of floating shoe 19 is shown in FIGS. 5, 6 and 7 which is adapted to measure the diameter of a short cylindrical part 54 whose length is smaller than the half width of the shoe. In this case the shoe 19 comprises a housing 55 inside which a cut-away contact 56 is housed and is integral with a tightening stirrup 57 secured or locked with the aid of a screw 58 on end 59 of the feeler rod 27. The groove 49 of the floating shoe 19 and the linear pivot 21 of the plate 15 (FIG. 1) are here limited by the housing 55 of the cut-away contact. The shoe 19 is represented as being retained by four screws 60 screwed in the four corners of the said shoe so as to permit its possible locking when such a necessitated by a too small span of the cut-away contact.

In other constructional variations (not shown), the position of the linear pivot 21 may be reversed that is to say, the linear edge may be disposed on the floating shoe 19 and the pivot itself may be differently shaped, provided that its function remains unchanged. By way of example, the pivot may be constituted by independent members such as bearings or rollers partially inserted in opposing faces of the housing of the plate 15 and of the shoe 19. The number of retaining members, such as is represented by the screws, would be adapted to the chosen solution and could be limited to a single one in the case of an elastic pivot integral in turn with the plate 15 and the shoe 19. Alternatively, the cut-away contact 56 could be directly screwed in the end of the feeler rod 27 in the place of the normal contact 28. Similarly, the comparator 35 may be replaced by an electronic feeler or other measuring gauge or transducer.

A further embodiment of the fixed jaw is shown in FIG. 8 and is adapted to measure cylindrical parts 61 of small diameter. The fixed jaw 62 as shown does not have any lateral abutments similar to those of the jaw 3 previously described but rather has a retractable plane support 63 vertically sliding in a housing or passage 64 of the said jaw 62. A screw 65 permits locking of support 63 in a desired position adapted to the diameter of the part to be measured. The fixed jaw 62 includes a block 66 identical to the block 6 of the already described jaw 3 and is angularly orientated in accordance with the same angle A (FIG. 2), with respect to the axis of the feeler rod 27.

To facilitate the reading of the indicator dial of the measuring instrument 35 (FIG. 1) when the adjustable gauge is used for the measurement of parts in the course of manufacture on a machine tool, a variation in the mounting of the said instrument is conceived for erecting this opposite the operator, in a position arranged towards the rear permitting the easy insertion of the gauge towards the part to be inspected between the obstacles of the machine tool. This variation is represented in FIG. 9 where a transmission system is illustrated having two angle return levers, the first lever 37, as already described, and a second identical lever 67, (schematically represented) connected by a push rod 68 sliding in a tube 69 inserted instead of and in place of the barrel 34 of the measuring instrument 35 in the socket 32 of the body 1 of the gauge of FIGS. 1 and 2.

The push rod 68 has a traversing cotter pin 70 displaceable in longitudinal grooves of the tube 69 while preventing rod 68 from turning. A compression spring 71 is inserted between this cotter pin 70 and a screw threaded plug 72 closing the housing of the said spring, and likewise forming an end bearing for the push-rod 68. This push-rod 68 has a collar 73 at its end which emerges from the body 1 of the gauge, and an arm of the second angle return lever 67 bears on collar 73. The second lever 67 is housed in a casing 74 provided with a bearing 75 and a tightening screw 76 adapted to maintain the barrel 34 of the measuring instrument 35 (FIG. 1). The feeler of the said measuring instrument whose the end 77 is shown, is thus maintained in contact, by the intermediary of the two levers 37 and 67 of the push-rod 68, with the feeler rod 27 of the gauge. A regulating nut 78, screwed on the threaded end of the tube 69, permits the adjustment of the angle return transmission assembly.

An arrangement is shown in FIG. 10 having the same object of facilitating the reading of the measuring instrument and the insertion of the gauge, and employs another use of the tube assembly 69 and push-rod 68 of the mounting shown in FIG. 9, but varies therefrom the direct bearing of the feeler 79, on the collar 73 of push-rod 68. The feeler 79 is part of a measuring apparatus of the indicator type having a lever 80 with a dial 81 and a support 82 with a stem 83 which is inserted in a housing passage 84 of the body 1 of the gauge and in which the stem is locked or secured by a screw (not shown). Here also regulating nut 78 of the tube 69 enables adjustment of the transmission to be effected.

The adjustable fork gauge described offers the advantage, thanks to the floating mounting of the shoe of its clamping jaw, of automatically compensating the faults in parallelism which could hitherto be produced between the two jaws of known adjustable fork gauges when the fixed jaw is displaced to adjust its position to the required calibration or even when the jaws are worn.

The system of floating shoe permits the consequential use of interchangeable fixed jaws without disturbing the precision of the instrument and thus enables its measuring capacity to be extended. The demountability of the floating shoe also permits the easy mounting of the cut-away contact, as described, again extending the measuring capacity of the gauge to cylindrical parts of very small length.

The special arrangement of the fixed jaw of the gauge comprising an anvil and of a lateral abutment integral with an inclined block, permits the automatic positioning of cylindrical parts of different diameters to be measured, their diametral plane coming automatically at right angles to the line of contact with the feeler rod, when these parts are simply applied against the lateral abutment of the fixed jaw. This advantage likewise extends to parts of very small diameter thanks to the possible described mounting of the fixed jaw comprising an adjustable bearing sliding vertically adjustable in its anvil.

Finally, the angle return transmission system described disposed between the feeler rod of the gauge and the feeler of the measuring instrument permits the displacement of measuring instrument towards the rear of the gauge and the orientation of its indicator dial towards the operator, thus making its use easy for the control of the parts in the course of manufacture on a machine tool. It likewise permits the use of all types of transducers and in particular the use of lever comparators.

What we claim is:

1. An adjustable fork gauge comprising a main body; said body having a slide on which a fixed jaw is slidably and adjustably mounted, said fixed jaw being formed from a slide block having an anvil with a plane face integral with said slide block; a spring clamping jaw means mounted in opposition to said anvil for pressing a portion of a part to be measured towards the anvil of the fixed jaws; a feeler rod for said part to be measured, said feeler rod being displaceably mounted in a bearing of the clamping jaw means whereby the axis of said feeler rod is perpendicular to the plane of the anvil of the fixed jaw; a contact means mounted on said feeler rod to emerge from said clamping jaw means for contacting said part to be measured; and an indicating transducer coupled to the body and having a movable element operatively connected to the feeler rod; wherein said fixed jaw has a lateral abutment means for supporting the said part to be measured and said abutment means has a plane face which is perpendicular to the plane face of the anvil of the fixed jaw; wherein said slide of the body and said slide block forming said fixed jaw are inclined at the same acute angle (A) with respect to the axis of the feeler rod and said acute angle is inscribed in a plane perpendicular to the two planes constituted by the plane face of the anvil and the plane face of the lateral abutment means of the fixed jaw; wherein said clamping jaw means includes a floating shoe at its end in opposition to said anvil, said floating shoe having a cylindrical bearing surface whose generatricies are, during working, parallel at least to the plane of the lateral abutment means of the fixed jaw; wherein said floating shoe is pivotally mounted on a linear pivot disposed between said end of the clamping jaw means and the floating shoe and the pivotal axis of which is perpendicular to the plane face of the lateral abutment means of the fixed jaw; and wherein said floating shoe is connected to the said end of the clamping jaw means by at least one retaining member.

2. A gauge according to claim 1 wherein said clamping jaw means includes a tubular support slidingly mounted in a bearing of said body, and wherein the bearing of the feeler rod is mounted concentrically and inside said tubular support.

3. A gauge according to claim 1, wherein said lateral abutment means of the fixed jaw is formed by a retractable support slidably mounted in a housing of said fixed jaw, perpendicularly to the plane face of the anvil.

4. A gauge according to claim 1, wherein said transducer is a lever comparator, and further comprising a transmission system between said feeler rod and the feeler of said lever comparator, said transmission system including an angled return lever acted on by a push rod housed in a tube comprising a resilient biasing means urging said push rod against the angled return lever, a member provided for preventing rotation of said push rod, and collar means at the free end of said push rod to form a bearing for the feeler of said lever comparator.

5. A gauge according to claim 1, wherein the floating shoe of the clamping jaw means comprises an inner housing in which is provided a cut-away portion housing a contact integral with a support secured to said feeler rod.

6. A gauge according to claim 5 wherein said support is screwed to the end of the feeler rod.

7. A gauge according to claim 1, further comprising a hand grip having control means for lifting up said clamping jaw means.

8. A gauge according to claim 1, further including a transmission system inserted between said feeler rod and the movable element of said transducer including an angled return lever.

9. A gauge according to claim 1, further comprising a transmission system between said feeler rod and the movable element of said transducer, said transmission system including two angled return levers connected together by a push rod.

10. A gauge according to claim 9, wherein said push rod of the tranmission system is housed in a tube comprising a resilient biasing means urging said push rod against the angled return lever operatively connected to the feeler rod, and wherein a member is provided for preventing rotation of said push rod.

* * * * *